US007888879B2

(12) United States Patent
Fischer

(10) Patent No.: US 7,888,879 B2
(45) Date of Patent: Feb. 15, 2011

(54) CIRCUIT ARRANGEMENT AND METHOD FOR OPERATING AT LEAST ONE ELECTRIC LAMP

(75) Inventor: Klaus Fischer, Friedberg (DE)

(73) Assignee: OSRAM Gesellschaft mit beschaenkter Haftung, Munich (DE)

( * ) Notice: Subject to any disclaimer, the term of this patent is extended or adjusted under 35 U.S.C. 154(b) by 513 days.

(21) Appl. No.: 11/988,734

(22) PCT Filed: Jul. 6, 2006

(86) PCT No.: PCT/DE2006/001169

§ 371 (c)(1),
(2), (4) Date: Jan. 14, 2008

(87) PCT Pub. No.: WO2007/006273

PCT Pub. Date: Jan. 18, 2007

(65) Prior Publication Data

US 2009/0167209 A1    Jul. 2, 2009

(30) Foreign Application Priority Data

Jul. 14, 2005    (DE) .................. 10 2005 032 960

(51) Int. Cl.
*H05B 37/00*    (2006.01)
(52) U.S. Cl. .................. 315/224; 315/219; 315/307
(58) Field of Classification Search .............. 315/219, 315/224, 291, 307, DIG. 5, DIG. 7
See application file for complete search history.

(56) References Cited

U.S. PATENT DOCUMENTS 5,287,046 A    2/1994   Carpenter et al.
7,009,854 B2 *  3/2006  Fushimi ................. 363/21.09

FOREIGN PATENT DOCUMENTS

| EP | 0 753 987 | 1/1997 |
|---|---|---|
| EP | 0 781 077 | 1/2001 |
| EP | 0 917 412 | 2/2003 |
| JP | 01 091620 | 4/1989 |
| WO | WO 96/09676 | 3/1996 |

* cited by examiner

*Primary Examiner*—David Hung Vu

(57) ABSTRACT

A circuit arrangement for operating at least one electric lamp having an inverter has at least one first and one second bridge transistor arranged in series with one another, a first drive circuit for the first bridge transistor; a second drive circuit for the second bridge transistor; the and second drive circuits being designed to drive the first and second bridge transistors to switch alternately completely on and off during normal lamp operation; and at least one protective apparatus; the at least one protective apparatus being designed, in the case of a value for a reference voltage, which is correlated with the voltage across the bridge transistor which has just been switched off, above a predeterminable limit value, to drive the bridge transistor, which has just been completely switched on, such that it is no longer completely switched on. A related method is also described.

19 Claims, 2 Drawing Sheets

CIRCUIT ARRANGEMENT AND METHOD FOR OPERATING AT LEAST ONE ELECTRIC LAMP

TECHNICAL FIELD

The present invention relates to a circuit arrangement for operating at least one electric lamp having an inverter having at least one first bridge transistor and one second bridge transistor which are arranged in series with one another, a first drive circuit for the first bridge transistor, a second drive circuit for the second bridge transistor, the first drive circuit and the second drive circuit being designed to drive the first bridge transistor and the second bridge transistor such that they switch alternately completely on and off during normal operation of the lamp, and having at least one protective apparatus. Moreover, it relates to an operating method for at least one electric lamp using such a circuit arrangement.

PRIOR ART

A generic circuit arrangement is known from EP 0 753 987. In this case, the protective apparatus is designed to stop the oscillation of the half bridge during detection of an abnormal operating state, for example a defective lamp or an increased operating voltage due to aging. For the detection of an abnormal operating state, a shutdown signal is evaluated which comprises two voltage components, namely a voltage which is proportional to the lamp voltage and a synchronization signal which is proportional to the time derivative of the inverter output voltage.

The present invention relates to another problem, specifically the protection of bridge transistors in a generic circuit arrangement from damage owing to surges. It will be described below using the example of a half-bridge arrangement in an electronic ballast for compact fluorescent lamps (energy-saving lamps.) In principle, the solution according to the invention can also be used, however, for full-bridge circuits or other bridge circuits in any desired devices.

The problem: all conventional electronic ballasts convert the low-frequency AC system voltage to a radiofrequency AC voltage for supplying a low-pressure discharge lamp. For this purpose, the system voltage is converted to a pulsating DC voltage using a rectifier. A downstream filter capacitor smooths this pulsating DC voltage to give a sufficiently constant DC voltage. The constant DC voltage of the filter capacitor is then "chopped" using a bridge circuit to give a radiofrequency AC voltage, which is then applied to a lamp, for example, via an inductance and at least one coupling capacitor and supplies this lamp. The value for the bridge voltage is identical to the voltage of this filter capacitor, which is charged to the peak value of the system voltage in each system half cycle.

In the case of bridge circuits, one transistor in each bridge branch is always completely switched on, with the exception of short commutation phases; accordingly, the total bridge voltage is therefore always present at the other, switched-off transistor. "Completely switched on" or "switched off" in the context of the present invention means the nonlinear switching operation of a transistor. The term "switched on" accordingly comprises driving of the bridge transistor such that it "is completely switched on" and driving of the bridge transistor such that it is operated in the linear mode. Since, as has been mentioned, the total bridge voltage is always present at the switched-off transistor, the dielectric strength of both bridge transistors therefore needs to be at least as great as the maximum possible peak value for the bridge voltage.

It is now also necessary to take into account the fact that the system voltage may be superimposed with high voltage peaks, so-called surge pulses, owing to environmental influences. These voltage peaks may reach amplitudes having a value which is a multiple of the level of the system voltage and have period durations of a few microseconds to a few milliseconds. The standard EN 61547 specifies the waveform of a triangular standard pulse having a rise time of the voltage of 1.2 μs and a decay time of 50 us for standardized measurements. Lamps with an integrated ballast need to be designed such that pulses with this waveform up to amplitudes of 500 V do not result in failure of the lamp. In reality, however, pulses with markedly higher amplitudes may also occur, in particular caused by lightning strikes in devices of the power supply or by inductive loads in the same circuit.

If a lamp is subjected to such voltage peaks, the filter capacitor charges to considerably higher voltages. For this reason, the dielectric strength of the bridge transistors in the half bridge needs to be higher than the maximum peak value for the system voltage. The minimum dielectric strength is set depending on the voltage values to which the filter capacitor is charged, to a maximum extent, in the event of the occurrence of voltage peaks, in particular surge pulses.

In the case of the electrolyte capacitors which are generally used for filtering purposes, the voltage does not rise, for example, up to the value of the amplitude of the surge pulse but is limited by chemical and/or electrical processes in this electrolyte capacitor to a maximum value which is essentially defined by the properties of the electrolyte material. The use of relatively highly resistive input impedances, i.e. a series resistor having a high resistance value in at least one of the system feedlines, may also result in a reduction in the maximum voltage values occurring at the filter capacitor.

In the case of bridge circuits, it is also necessary to take into account the fact that no current limiting is provided at the beginning of a voltage breakdown of the bridge transistor which is switched off at that time, because the other bridge transistor is completely switched on, and a second current path can therefore be formed parallel to the filter capacitor via both bridge transistors. The capability of MOS transistors to allow a limited current to flow without any interference when their reverse voltage is exceeded, so-called avalanche resistance, is insufficient as a self-protection means. The energy which an MOS transistor can absorb in this operating mode, the so-called avalanche mode, is much too low in comparison with the energy of the surge pulse.

Since, primarily in the case of MOS transistors, the dielectric strength, owing to the square relationship, has a considerable influence on the required silicon chip area, it is very advantageous for reasons of costs to set the minimum required dielectric strength to be as low as possible. In the ideal case, it only needs to be slightly higher than the maximum amplitude value of the system input voltage.

SUMMARY OF THE INVENTION

The object of the present invention consists in developing a generic circuit arrangement or a generic method such that the use of bridge transistors with a reduced dielectric strength is made possible without in the process impairing the operational reliability in the event of the occurrence of high surge pulses.

This object is achieved by a circuit arrangement having the features of patent claim 1.

The invention is based on the concept that, in the event of the occurrence of high voltage peaks in the supply, the switched-off bridge transistor remains switched off and the switched-on bridge transistor is driven such that it is no longer completely switched on. As a result, it is possible for the high bridge voltage to be split between the two bridge transistors. The fact that the lamp is as a result extinguished for a short period of time does not present a problem.

The solution according to the invention makes it possible, even in the case of high voltages at the filter capacitor during the occurrence of surge pulses, for the voltage at each individual bridge transistor to be less than the bridge voltage. If the transistor which has just been switched on is driven such that it is now operated in the linear range, although the bridge voltage is split between the two bridge transistors, a larger proportion of the bridge voltage is present across the switched-off bridge transistor than across the bridge transistor which is operated in the linear range. If, as an alternative, the bridge transistor, which has just been completely switched on, of the series circuit is driven, when a surge pulse is detected, such that it is likewise switched off, the voltage drop across each individual bridge transistor is only approximately half of the bridge voltage. This means that the maximum bridge voltage can reach the value for the sum of the dielectric strengths of the individual bridge transistors in a bridge branch, without there being any damage to the circuit arrangement. In an arrangement without a protective apparatus, the bridge voltage, in order to avoid failures, could only be as great as the dielectric strength of the bridge transistor with the lowest dielectric strength.

One further advantage of the solution according to the invention consists in the fact that a second branch-off current path for the energy of a surge pulse cannot be formed via the bridge transistors in parallel with the filter capacitor. This firstly means that the total energy of the surge pulse is essentially converted to heat in the filter capacitor. In this context, reference is made to the fact that only negligible proportions of the energy of the surge pulse are absorbed in the resistors of the protective apparatuses, which will be explained in more detail further below and are included for measurement purposes. Secondly, the bridge transistors are also protected against overload when, owing to the resonant design of a load circuit, for example owing to a current impressed in the lamp inductor, the voltage across one of the bridge transistors is so great that this transistor changes over to the above-described avalanche mode and diverts the energy stored in this inductor for this transistor. Since the transistor which is completely switched on at that time is brought into the linear mode or is switched off by means of the protective circuit according to the invention, it is not possible for parts of the energy of a surge pulse to be fed to the transistor which is in the avalanche mode.

One preferred embodiment is characterized by the fact that it comprises a first protective apparatus and a second protective apparatus, the first protective apparatus being designed to switch the second bridge transistor off if a first reference voltage, which is correlated with the voltage present at the first bridge transistor, exceeds a predeterminable limit value, and the second protective apparatus being designed to switch the first bridge transistor off if a second reference voltage, which is correlated with the voltage present at the second bridge transistor, exceeds a predeterminable limit value. Owing to the provision of two protective apparatuses, the bridge transistor which has just been switched on can be switched to the linear mode or switched off at any point in time in the occurrence of a voltage peak. In the case of a full-bridge arrangement in place of a half-bridge arrangement, four protective apparatuses are preferably provided.

It is furthermore preferred if each bridge transistor has a control terminal and then at least one protective apparatus is coupled between the drive circuit and the control terminal of the associated bridge transistor. This measure makes it possible to protect the bridge transistor without using power components in the protective apparatus.

In one development of this embodiment, each transistor preferably has a reference terminal, the at least one protective apparatus being arranged in parallel with the control terminal-reference terminal path of the associated bridge transistor and being designed to short-circuit the control terminal-reference terminal path of the associated bridge transistor for disconnection purposes. As a result of this measure, the drive signal of the drive circuit is superimposed by the signal of the protective apparatus in the case in which the protective apparatus responds. During normal operation of the lamp, the protective apparatus does not interfere with the drive circuit.

The predeterminable limit value is preferably less than or equal to the maximum permissible reverse voltage or less than or equal to the breakdown voltage of a bridge transistor. The dielectric strength of the bridge transistors can therefore be utilized in optimum fashion. Only when the dielectric strength is no longer sufficient does the associated protective apparatus respond.

It is furthermore preferred if the respective reference voltage corresponds to the respective reference voltage across the switched-off bridge transistor. However, provision may also be made for the respective reference voltage to correspond to the sum of the following voltages: the voltage across the switched-off bridge transistor and the voltage at the output of the drive circuit of the switched-on bridge transistor. In the lastmentioned case, the voltage at the output of the drive circuit of the switched-on transistor needs to be taken into account when setting the dimension for the predeterminable limit value.

The protective apparatus is preferably furthermore designed to leave the associated bridge transistor switched off until the value for the reference voltage has again fallen below the predeterminable limit value. As a result, the switched-off state of the lamp is limited to the minimum which is required for protecting the bridge transistors. The period of time without any light generation is therefore minimal.

Further advantageous embodiments are described in the dependent claims.

BRIEF DESCRIPTION OF THE DRAWINGS

Two exemplary embodiments of a circuit arrangement according to the invention will be described in more detail below with reference to the attached drawings, in which.

PREFERRED EMBODIMENT OF THE INVENTION

Figure 1:
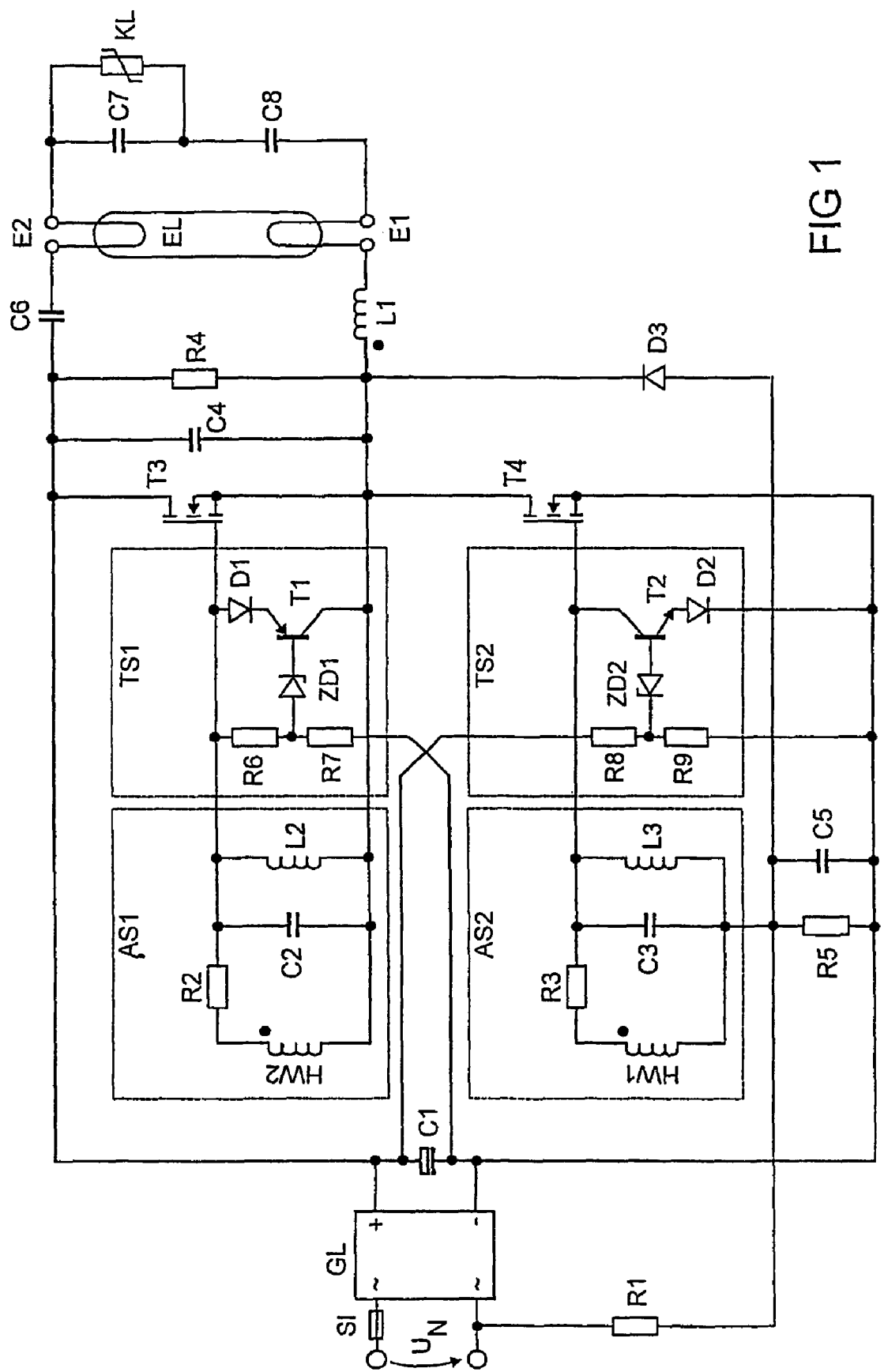
FIG. 1 shows a first exemplary embodiment of a circuit arrangement according to the invention with two N-channel MOS transistors as bridge transistors.

FIG. 1 shows a circuit arrangement according to the invention with a half-bridge arrangement, which comprises two N-channel MOS transistors T3, T4, each having a dedicated drive circuit AS1, AS2. The operation of this circuit arrangement is described in more detail in the patent specification EP 0 781 077 B1 and EP 0 917 412 B1. However, this operation is irrelevant to the following embodiments as regards the purpose of the present invention. Those components that are not mentioned again in the further description of the invention are therefore only to be explained briefly: the half-bridge center point is connected to a first electrode E1 of the lamp EL via an inductor L1, while a second electrode E2 of the lamp is connected to a filter capacitor C1 via a capacitor C6. The parallel circuit comprising a capacitor C4 and a nonreactive resistor R4 is arranged in parallel with the bridge transistor T3. On the output side, the series circuit comprising two capacitors C7 and C8 is arranged in parallel with the lamp EL, a PTC thermistor KL being connected in parallel with the capacitor C7. On the input side, the system voltage $U_N$ is present at the filter capacitor C1 via a fuse SI and a rectifier GL. The resistors R1 and R5 and the capacitor C5 and the diode D3 are elements of a startup circuit, as is described in more detail in EP 0 917 412 B1 already mentioned. As regards the present invention, however, they are irrelevant, for which reason no further details are given on these elements.

In FIG. 1, a dedicated protective circuit TS1, TS2 is provided for each transistor T3, T4 of the half-bridge arrangement. The transistor T3 is protected by the protective circuit TS2, and the transistor T4 is protected by the protective circuit TS1. The protective effect for the bridge transistor T3 is brought about as a result of the bridge transistor T4 being switched off immediately, which is made possible owing to the protective circuit TS2. The protective effect for the bridge transistor T4 is brought about by the bridge transistor T3 being switched off immediately, which is made possible owing to the protective circuit TS1.

The protective circuits TS1 and TS2 are connected in series between the drive circuits AS1 and AS2, on the one hand, and the control terminals of the bridge transistors T3 and T4, on the other hand. The two protective circuits TS1, TS2 are designed such that, when a predeterminable value for the voltage across a bridge transistor T3, T4 is exceeded, the other bridge transistor T4, T3 is actively switched off without delay by the control input of the respective bridge transistor being connected at a low resistance to the corresponding reference potential, i.e. the control input being short-circuited. In this case it is possible to set this predeterminable value as a function of the dielectric strength of the transistor to be protected. It is also possible for the two protective circuits TS1, TS2 to have different voltage values, which result in a bridge transistor being switched off.

A transistor T1, T2 is used in each of the protective circuits TS1, TS2 and makes it possible to short-circuit the control input of a bridge transistor T3, T4. Since the output voltage of the drive circuits AS1, AS2 can also assume negative values, diodes are connected, in series, into the emitter terminals in order to protect the transistors T1, T2 in the protective circuits TS1, TS2 such that the base-emitter diode of the transistors T1 and T2 is not overloaded. These diodes D1, D2 can alternatively also be connected into the collector terminals. If other drive circuits AS1, AS2 are used in which the output voltage cannot assume negative values, the two protective circuits TS1, TS2 may be designed to be without the diodes D1, D2. In this case, the emitter terminals of the transistors T1, T2 are coupled directly to the control input terminals of the bridge transistors T3, T4. By suitably selecting the ratio of two resistors R6/R7, R8/R9 connected in series, the value for the sum of the bridge voltage and the output voltage of the corresponding drive circuit AS1, AS2 is given which leads to the transistor T1, T2 in the protective circuit TS1, TS2 being switched on and therefore to a bridge transistor T3, T4 being switched off. For this purpose, the series circuit comprising the resistors R6/R7, R8/R9 of a protective circuit TS1, TS2 is arranged such that one terminal is coupled to the control input terminal of a bridge transistor T3, T4, and the other terminal is coupled to the bridge potential at the filter capacitor C1, which is not directly connected to the bridge transistor T4, T3 to be switched off.

In order to make the switching-on of the transistor T1, T2 in a protective circuit TS1, TS2 independent of the temperature-dependent operating point of this transistor T1, T2, a zener diode ZD1, ZD2 is connected in series with the control terminal of this transistor. The transistor T1, T2 in a protective circuit TS1, TS2 is then switched on and therefore short-circuits the control terminal of the associated bridge transistor T3, T4 if the voltage at the resistor R6, R8 is greater than the sum of the threshold voltage of the transistor T1, T2 in the protective circuit TS1, TS2 and the zener voltage of the zener diode ZD1, ZD2.

In the case of the protective circuit TS1, which switches off the bridge transistor connected to the positive bridge potential, the so-called high-side transistor T3, this is the case when the voltage across the bridge transistor T4, which is switched off in any case, plus the output voltage of the dedicated drive circuit AS1 exceeds a value which can be set.

In the protective circuit TS2, which switches off the bridge transistor connected to the negative bridge potential, the so-called low-side transistor T4, this is the case when the voltage across the bridge transistor T3, which is switched off in any case, exceeds a value which can be set.

The principle of the circuit arrangement described with reference to FIG. 1 can also be transferred to bridge arrangements with complementary bridge transistors. A corresponding circuit arrangement is shown in FIG. 2.

Components which correspond in terms of their function to those in FIG. 1 have the same reference symbols and will not be described again.

Figure 2:
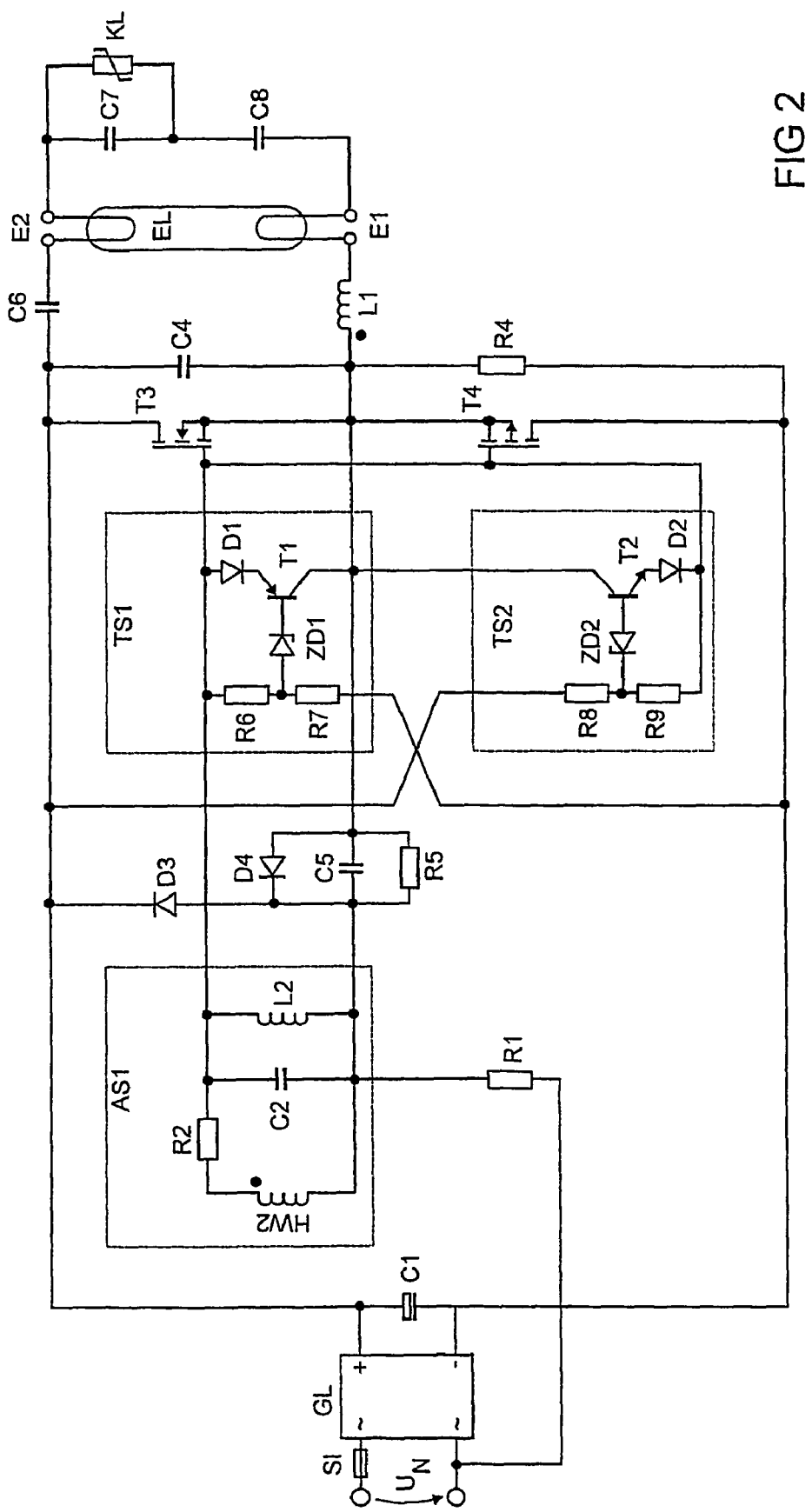
FIG. 2 shows a second exemplary embodiment of a circuit arrangement according to the invention with complementary bridge transistors.

In the half-bridge arrangement illustrated in FIG. 2 with complementary bridge transistors T3, T4, the outputs of the protective circuits TS1 and TS2 are connected in parallel in order to short-circuit both positive and negative control voltages with respect to the bridge mid-potential.

As is obvious to a person skilled in the art, modifications to the protective circuits described with reference to FIG. 1 and FIG. 2 are conceivable. For example, it is possible to realize a protective circuit which includes a bidirectional switching element, for example, a triac. When using a bidirectional switching element, a protective circuit is only necessary in which this bidirectional switching element can be switched on both with a negative control voltage and a positive control voltage in order to short-circuit the output voltage of a drive circuit irrespective of the instantaneous polarity of said output voltage.

The invention claimed is:

1. A circuit arrangement for operating at least one electric lamp (EL) having an inverter having at least one first bridge transistor (T3) and one second bridge transistor (T4) which are arranged in series with one another, a first drive circuit (AS1) for the first bridge transistor (T3); a second drive circuit (AS2) for the second bridge transistor (T4); the first drive circuit (AS1) and the second drive circuit (AS2) being designed to drive the first bridge transistor (T3) and the second bridge transistor (T4) such that they switch alternately completely on and off during normal operation of the lamp (EL); and at least one protective apparatus (TS1; TS2); characterized in that the at least one protective apparatus (TS1; TS2) is designed, in the case of a value for a reference voltage, which is correlated with the voltage across the bridge transistor (T3; T4) which has just been switched off, above a predeterminable limit value, to drive the bridge transistor (T4; T3), which has just been completely switched on, of the series circuit such that it is no longer completely switched on.

2. The circuit arrangement as claimed in claim 1, characterized in that the at least one protective apparatus (TS1; TS2) is designed, in the case of a value for a reference voltage, which is correlated with the voltage across the bridge transistor (T3; T4) which has just been switched off, above a predeterminable limit value, to drive the bridge transistor (T4; T3), which has just been completely switched on, of the series circuit such that it is operated in the linear range.

3. The circuit arrangement as claimed in claim 1, characterized in that the at least one protective apparatus (TS1; TS2) is designed, in the case of a value for a reference voltage, which is correlated with the voltage across the bridge transistor (T3; T4) which has just been switched off, above a predeterminable limit value, to drive the bridge transistor (T4; T3), which has just been completely switched on, of the series circuit such that it is switched off.

4. The circuit arrangement as claimed in claim 1, characterized in that it is designed, in the case of a value for a reference voltage, which is correlated with the voltage across the bridge transistor (T3; T4) which has just been switched off, above a predeterminable limit value, to drive the two bridge transistors (T3, T4) such that they remain switched off, at least over a predeterminable period of time, in particular until the reference voltage has again fallen below the predeterminable limit value.

5. The circuit arrangement as claimed in claim 1, characterized in that it comprises a first protective apparatus (TS1) and a second protective apparatus (TS2), the first protective apparatus (TS1) being designed to switch the second bridge transistor (T4) off if a first reference voltage, which is correlated with the voltage present at the first bridge transistor (T3), exceeds a predeterminable limit value, and the second protective apparatus (TS2) being designed to switch the first bridge transistor (T3) off if a second reference voltage, which is correlated with the voltage present at the second bridge transistor (T4), exceeds a predeterminable limit value.

6. The circuit arrangement as claimed in claim 1, characterized in that each bridge transistor (T3; T4) has a control terminal, the at least one protective apparatus (TS1; TS2) being coupled between the drive circuit (AS1; AS2) and the control terminal of the associated bridge transistor (T3; T4).

7. The circuit arrangement as claimed in claim 6, characterized in that each bridge transistor (T3; T4) has a reference terminal, the at least one protective apparatus (TS1; TS2) being arranged in parallel with the control terminal-reference terminal path of the associated bridge transistor (T3; T4) and being designed to short-circuit the control terminal-reference terminal path of the associated bridge transistor (T3; T4) for disconnection purposes.

8. The circuit arrangement as claimed in claim 1, characterized in that the predeterminable limit value is less than or equal to the maximum permissible reverse voltage of a bridge transistor (T3; T4).

9. The circuit arrangement as claimed in claim 1, characterized in that the respective reference voltage corresponds to the voltage across the switched-off bridge transistor (T3; T4).

10. The circuit arrangement as claimed in claim 1, characterized in that the respective reference voltage corresponds to the sum of the following voltages: the voltage across the switched-off bridge transistor (T3; T4); and the voltage at the output of the drive circuit (AS1; AS2) of the switched-on bridge transistor (T3; T4).

11. The circuit arrangement as claimed in claim 1, characterized in that the protective apparatus (TS1; TS2) is designed to leave the associated bridge transistor (T3; T4) switched off until the value for the reference voltage has again fallen below the predeterminable limit value.

12. The circuit arrangement as claimed in claim 2, characterized in that it is designed, in the case of a value for a reference voltage, which is correlated with the voltage across the bridge transistor (T3; T4) which has just been switched off, above a predeterminable limit value, to drive the two bridge transistors (T3, T4) such that they remain switched off, at least over a predeterminable period of time, in particular until the reference voltage has again fallen below the predeterminable limit value.

13. The circuit arrangement as claimed in claim 3, characterized in that it is designed, in the case of a value for a reference voltage, which is correlated with the voltage across the bridge transistor (T3; T4) which has just been switched off, above a predeterminable limit value, to drive the two bridge transistors (T3, T4) such that they remain switched off, at least over a predeterminable period of time, in particular until the reference voltage has again fallen below the predeterminable limit value.

14. The circuit arrangement as claimed in claim 2, characterized in that it comprises a first protective apparatus (TS1) and a second protective apparatus (TS2), the first protective apparatus (TS1) being designed to switch the second bridge transistor (T4) off if a first reference voltage, which is correlated with the voltage present at the first bridge transistor (T3), exceeds a predeterminable limit value, and the second protective apparatus (TS2) being designed to switch the first bridge transistor (T3) off if a second reference voltage, which is correlated with the voltage present at the second bridge transistor (T4), exceeds a predeterminable limit value.

15. The circuit arrangement as claimed in claim 3, characterized in that it comprises a first protective apparatus (TS1) and a second protective apparatus (TS2), the first protective apparatus (TS1) being designed to switch the second bridge transistor (T4) off if a first reference voltage, which is correlated with the voltage present at the first bridge transistor (T3), exceeds a predeterminable limit value, and the second protective apparatus (TS2) being designed to switch the first bridge transistor (T3) off if a second reference voltage, which is correlated with the voltage present at the second bridge transistor (T4), exceeds a predeterminable limit value.

16. The circuit arrangement as claimed in claim 4, characterized in that it comprises a first protective apparatus (TS1) and a second protective apparatus (TS2), the first protective apparatus (TS1) being designed to switch the second bridge transistor (T4) off if a first reference voltage, which is correlated with the voltage present at the first bridge transistor (T3), exceeds a predeterminable limit value, and the second protective apparatus (TS2) being designed to switch the first bridge transistor (T3) off if a second reference voltage, which is correlated with the voltage present at the second bridge transistor (T4), exceeds a predeterminable limit value.

17. The circuit arrangement as claimed in claim 2 characterized in that each bridge transistor (T3; T4) has a control terminal, the at least one protective apparatus (TS1; TS2) being coupled between the drive circuit (AS1; AS2) and the control terminal of the associated bridge transistor (T3; T4).

18. The circuit arrangement as claimed in claim 3 characterized in that each bridge transistor (T3; T4) has a control terminal, the at least one protective apparatus (TS1; TS2) being coupled between the drive circuit (AS1; AS2) and the control terminal of the associated bridge transistor (T3; T4).

19. The circuit arrangement as claimed in claim 4, characterized in that each bridge transistor (T3; T4) has a control terminal, the at least one protective apparatus (TS1; TS2) being coupled between the drive circuit (AS1; AS2) and the control terminal of the associated bridge transistor (T3; T4).

* * * * *